US012645299B2

(12) United States Patent
Wu et al.

(10) Patent No.: US 12,645,299 B2
(45) Date of Patent: Jun. 2, 2026

(54) DEVICE CONTROL METHOD AND ELECTRONIC DEVICE

(71) Applicant: Lenovo (Beijing) Limited, Beijing (CN)

(72) Inventors: Meng Wu, Beijing (CN); Difei Zhang, Beijing (CN); Haifang Tan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 332 days.

(21) Appl. No.: 18/604,180

(22) Filed: Mar. 13, 2024

(65) Prior Publication Data

US 2024/0319792 A1     Sep. 26, 2024

(30) Foreign Application Priority Data

Mar. 24, 2023     (CN) .......................... 202310298461.0

(51) Int. Cl.
*G06F 3/01*          (2006.01)
*A63F 13/285*     (2014.01)
*G06F 3/0483*     (2013.01)

(52) U.S. Cl.
CPC ............ *G06F 3/016* (2013.01); *A63F 13/285* (2014.09); *G06F 3/0483* (2013.01)

(58) Field of Classification Search
None
See application file for complete search history.

(56) References Cited

U.S. PATENT DOCUMENTS 8,694,207 B2 * 4/2014 Stuetzler ............... B60W 40/12
                                                                701/38
2019/0212825 A1 * 7/2019 Simmons ................ G06F 3/016
2021/0064061 A1 * 3/2021 Heard ..................... B64C 17/08

FOREIGN PATENT DOCUMENTS

CN          109525723 B  * 8/2021   ............. G06F 3/011

* cited by examiner

*Primary Examiner* — Tuan S Nguyen
(74) *Attorney, Agent, or Firm* — ANOVA LAW GROUP, PLLC

(57)     ABSTRACT

A device control method includes obtaining a first parameter associated with a display content of a target application and adjusting a center of gravity of an electronic device based on the first parameter, the target application running on the electronic device.

15 Claims, 4 Drawing Sheets

S110

Obtaining a first parameter associated with the display content of a target application

S120

Adjusting the center of gravity of an electronic device based on the first parameter, the target application running on the electronic device

Obtaining a first parameter associated with the display content of a target application

S120

Adjusting the center of gravity of an electronic device based on the first parameter, the target application running on the electronic device

300

310

320

DEVICE CONTROL METHOD AND ELECTRONIC DEVICE

CROSS-REFERENCE TO RELATED APPLICATION

This application claims priority to Chinese Patent Application No. 2023102984610, filed on Mar. 24, 2023, and the entire content of which is incorporated herein by reference.

TECHNICAL FIELD

The present disclosure relates to the technical field of electronic device technology, and more particularly, to a device control method and an electronic device.

BACKGROUND

With the development of electronic device-related technologies, not only has hardware become more capable, but also software has provided more functions. The software and hardware of electronic devices may be integrated to replace the functions of many physical objects. For example, through installing application programs on electronic devices such as smart phones or tablet computers, the electronic devices can provide functions of physical objects such as books, remote controls, game consoles, compasses, calculators, magnetic cards, and NFC cards, thereby facilitating convenience in users' daily life.

However, these electronic devices lack the physical feel of physical objects, resulting in poor user experience.

SUMMARY

One aspect of the present disclosure provides a device control method. The method includes: obtaining a first parameter associated with a display content of a target application; and adjusting a center of gravity of an electronic device based on the first parameter, the target application running on the electronic device.

Another aspect of the present disclosure provides an electronic device. The device includes: a display unit configured to display a display content of a target application; and a center-of-gravity adjustment structure configured to obtain a first parameter associated with a display content of a target application, and adjust a center of gravity of an electronic device based on the first parameter, the target application running on the electronic device.

DETAILED DESCRIPTION OF THE EMBODIMENTS

Various aspects and features of the present application are described herein with reference to the accompanying drawings.

It should be understood that various modifications may be made to the embodiments herein. Therefore, the description should not be viewed as limiting, but merely as examples of various embodiments. Other modifications within the scope and spirit of the present disclosure may also occur to those skilled in the art.

The accompanying drawings, which are incorporated in and constitute a part of the specification, illustrate the embodiments of the present disclosure. Together with the general description of the present disclosure given below and the detailed description of the embodiments given below, the principle of the present disclosure is illustrated.

The features of the present disclosure will become apparent from the following description of various embodiments given as non-limiting examples with reference to the accompanying drawings.

It should be understood that, although the present disclosure has been described with reference to specific examples, those skilled in the art will be able to undoubtedly implement many other equivalent forms of the present disclosure, which have the characteristics as claimed and therefore all fall within the scope of protection.

The aspects, features, and advantages of the present disclosure will become more apparent in view of the following detailed description when taken in conjunction with the accompanying drawings.

Hereinafter, specific embodiments of the present disclosure will be described with reference to the accompanying drawings. However, it should be understood that the embodiments are merely certain examples of the present disclosure, which can be implemented in various ways. Well-known and/or repeated functions and structures have not been described in detail to avoid obscuring the present disclosure with unnecessary or redundant detail. Therefore, specific structural and functional details described herein are not intended to be limiting, but merely serve as a representative basis to teach one skilled in the art to variously utilize the present disclosure in substantially any suitable detailed structure.

This specification may use the phrases "in one embodiment," "in another embodiment," "in yet another embodiment," or "in some embodiments," which may refer to the same or one or more of the different embodiments in accordance with the present disclosure.

The present disclosure provides a device control method. The device control method may be applied to an electronic device. The electronic device may have a display unit capable of outputting display content and a center-of-gravity adjustment structure capable of adjusting the center of gravity of the electronic device. The electronic device includes but is not limited to a tablet computer, a smart phone, an e-readers, an electronic game console, etc. The type of electronic devices is not limited herein.

Figures 1, 2:
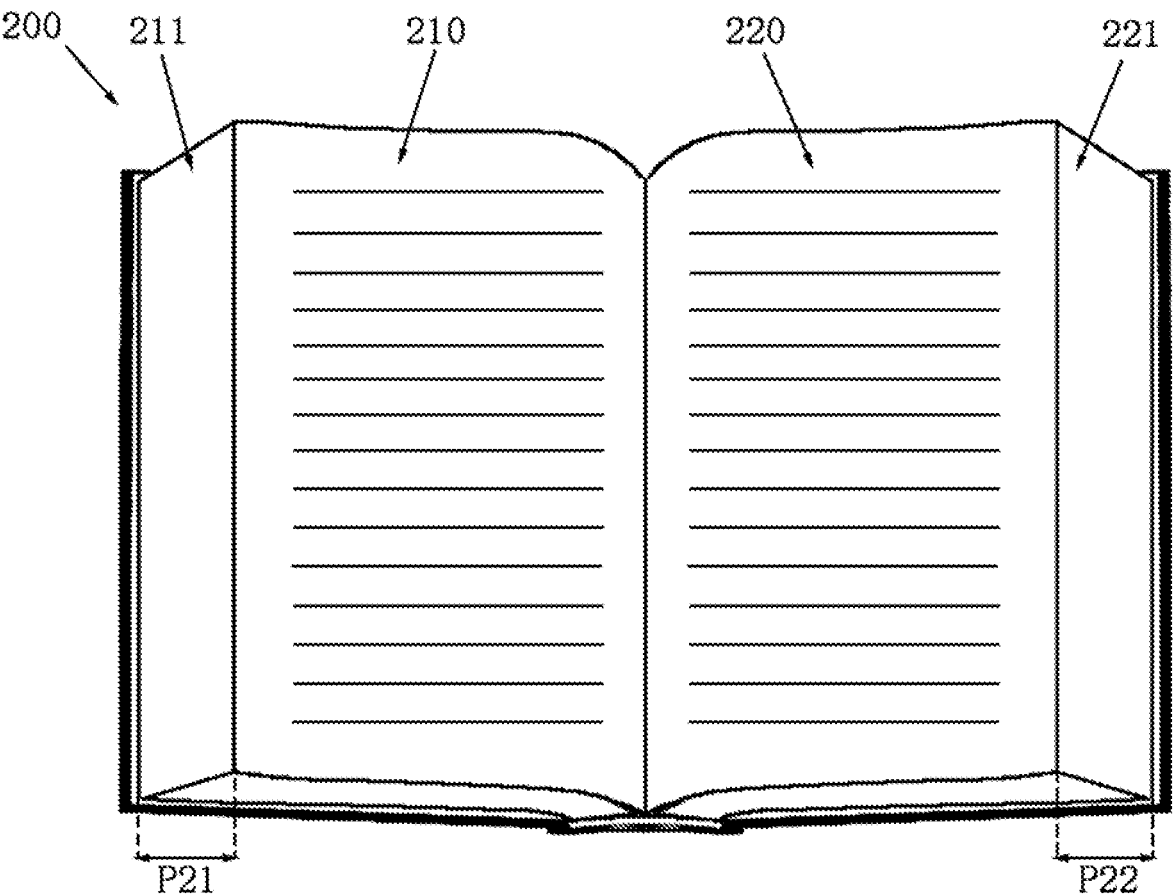
FIG. 1 is a flowchart of a device control method according to some embodiments of the present disclosure.
FIG. 2 is a schematic diagram of a display interface in a device control method according to some embodiments of the present disclosure.

FIG. 1 is a flowchart of a device control method according to some embodiments of the present disclosure. Referring to FIG. 1, the device control method may include the following processes.

At S110, a first parameter associated with the display content of a target application is obtained.

In some embodiments, the target application may be various application programs with a display interface that are installed and run on the electronic device. For example, the electronic device may be an e-book, video software, office software, game software, etc. The display content may include one or more display objects in the display interface of the target application. The first parameter may include various parameters associated with the display content. The target application may also refer to a display management program in the operating system, and the display content of the target application is the display content of the human-computer interaction interface of the operating system.

Taking the e-book software as an example, the display content may include text content in the display interface of the e-book software, or may also include display icons in the display interface of the e-book software. The first parameter may include parameters used to identify reading progress of the text content, the number of pages currently read, or other characteristics.

Taking the video software as an example, the display content may include video content displayed by the video software, may also include a progress bar used to identify video playback progress in the video software, and may also include display icons such as fast forward, next episode, etc. in the video software. The first parameter may include parameters used to identify the video playback progress, fast forward speed, and operation items, etc.

In some embodiments, obtaining the first parameter associated with the display content of the target application includes: obtaining a progress parameter corresponding to the display content of the target application.

In some other embodiments, obtaining the first parameter associated with the display content of the target application includes: obtaining a display content parameter corresponding to the display content of the target application, and determining the first parameter according to the display content parameter. For example, if the display content parameter is the page number of the e-book display content page, an e-book reading progress parameter is calculated as the first parameter based on the page number and the total number of pages of the e-book.

Taking the game software as an example, the display content may include game objects in the game software, and may also include display icons used to control the game objects. The first parameter may include parameters identifying a position, a movement speed, a virtual weight, length, a quantity, a status, etc. of the game objects.

At S120, the center of gravity of the electronic device is adjusted according to the first parameter, and the target application runs in the electronic device.

In some embodiments, the electronic device may have a center-of-gravity adjustment structure, and a center of gravity of the electronic device may be adjusted according to the first parameter through the center-of-gravity adjustment structure. In some embodiments, the center-of-gravity adjustment structure may include one or more counterweights, and a driving device for driving the counterweights to change positions. The driving device may drive the counterweights to move to change the center of gravity of the electronic device. In some embodiments, the electronic device may also be connected to an external center-of-gravity adjustment structure.

In some embodiments, when the first parameter is obtained, target position information used to identify a target position may be determined based on the first parameter. The driving device is controlled to drive the counterweights to move to the target position according to the target position information, such that the center of gravity of the electronic device is adjusted to a second position. Alternatively, according to the target position information, the driving device is controlled to drive the counterweights to move to adjust the center of gravity of the electronic device to the target position.

Taking a weight change during simulated book reading as an example, the first parameter may be used to identify the current reading progress of the e-book. The target position corresponding to the current reading progress may be determined according to the current reading progress of the e-book, and the driving device is controlled to move the counterweights to the target position, thereby forming a weight change experience similar to the reading process of a physical book.

Taking a position change of a game object in a simulated game scene as an example, the first parameter may be used to identify the current position of the game object. The target position of the counterweights can be determined based on the current position of the game object, and movement of the counterweights may be controlled to create a more realistic gaming experience.

In some embodiments, when the first parameter is obtained, a movement parameter used to identify a movement state of the counterweights may also be determined based on the first parameter. The driving device is controlled according to the movement parameter to drive the counterweights to move to form a center of gravity change process. For example, a second movement parameter for identifying a second movement state of the counterweights may be determined based on the first movement parameter that can identify the first movement state of the game object. The movement of the counterweights is controlled according to the second movement parameter to improve the game simulation effect.

In the embodiments of the present disclosure, the device control method includes obtaining the first parameter associated with the display content of the target application, and adjusting the center of gravity of the electronic device according to the first parameter, such that the electronic device can cooperate with changes in the display content of the target application and provide a perceptual experience of the weight changes. Thus, the sense of entity is improved when the target application is running on the electronic device.

In some embodiments, the first parameter may vary within a first value range. That is, the first parameter may take a value within the first value range.

At S120, adjusting the center of gravity of the electronic device according to the first parameter may include: when the first parameter is the minimum value within the first value range, adjusting the center of gravity of the electronic device to a first position, the first position being located close to a first edge of the electronic device; and when the first parameter is the maximum value within the first value range, adjusting the center of gravity of the electronic device to the second position, the second position being located close to a second edge of the electronic device.

The second edge is an edge on the opposite side of the first edge. In some embodiments, the first edge and the second edge may be any two opposite edges of the electronic device. For example, the first edge may be a left edge of the electronic device, and the second edge may be a right edge of the electronic device. In another example, the first edge may be an upper edge of the electronic device, and the second edge may be a lower edge of the electronic device. Of course, when the shape of the display unit of the electronic device is irregular, the first edge and the second edge are not limited to the upper, lower, left, and right edges, but may also be edges in other directions of the electronic device.

Taking the e-book software as an example, the display interface of the e-book may have a display object used to identify the reading progress, and the first parameter may be associated with the display object. The first parameter may be used to identify the e-book reading progress, and the first parameter may take a value in the range of [0, 1]. When the first parameter is 0, the center of gravity of the electronic device may be adjusted to be close to the left edge of the electronic device. When the first parameter is 1, the center of gravity of the electronic device may be adjusted to be close to the right edge of the electronic device.

Taking the game software as an example, the display interface of the game software may display one or more game objects, and heights of the game objects change from the lower edge to the upper edge of the electronic device. The first parameter may be used to identify the heights of the game objects, and the first parameter may take a value in the range of [0, K]. When the first parameter is 0, the center of gravity of the electronic device may be adjusted to be close to the lower edge of the electronic device. When the first parameter is K, the center of gravity of the electronic device may be adjusted to be close to the upper edge of the electronic device.

It should be noted that the first position and the second position are relative concepts. The straight-line distances between the first position and the first edge and between the first position and the second edge may be represented by L11 and L12 (not shown) respectively, and the straight-line distances between the second position and the first edge and between the second position and the second edge may be represented by L21 and L22 (not shown) respectively. When the first parameter is the minimum value within the first value range, as long as L11 is greater than L21, L11 is not required to be greater than L12. When the first parameter is the maximum value within the first value range, as long as L22 is greater than L12, L22 is not required to be greater than L21. That is, when the center of gravity is located at the first position, an absolute position of the center of gravity is not necessarily close to the first edge, and when the center of gravity is located at the second position, the absolute position of the center of gravity is not necessarily close to the second edge. As long as the value of the first parameter gradually decreases within the first value range, the center of gravity of the electronic device is gradually adjusted toward the first edge of the electronic device, and as long as the value of the first parameter gradually increases within the first value range, the center of gravity of the electronic device is gradually adjusted toward the second edge of the electronic device.

In some embodiments, corresponding to the center of gravity of the electronic device, the counterweights of the center-of-gravity adjustment structure may have a first weight position corresponding to the first position, and a second weight position corresponding to the second position. The first weight position may be close to the first edge of the electronic device relative to the second weight position. The second weight position may be close to the second edge of the electronic device relative to the first weight position. When the first parameter is the minimum value of the first value range, the counterweights may be adjusted to the first weight position, thereby adjusting the center of gravity of the electronic device to the first position. When the first parameter is the maximum value of the first value range, the counterweights may be adjusted to the second weight position, thereby adjusting the center of gravity of the electronic device to the second position.

In some embodiments, a change amount of the first parameter has a certain proportional relationship with a change distance of the center of gravity of the electronic device in a first direction. The first direction is perpendicular to the first edge and points toward a direction from the first edge to the second edge. The first direction matches a display direction of a switching effect of the target application.

In some embodiments, the first direction may be a left-right direction of the display unit of the electronic device, or may be an up-down direction of the display unit. Alternatively, when the display unit has an irregular shape, the first direction may also be another direction of the display unit.

In some embodiments, the first value range may be determined in advance. That is, the value range of the first parameter is determined in advance. A control range of the center of gravity of the electronic device in the first direction may also be determined in advance. A certain proportional relationship between the change amount of the first parameter and the change distance of the center of gravity of the electronic device in the first direction may be determined based on the first value range and the control range. Then, when the first parameter is determined, the center of gravity of the electronic device may be adjusted according to the first parameter and the certain proportional relationship.

In some embodiments, the first value range, a first control range, and a second control range may also be determined in advance. The first control range may be a change range of the counterweights in the first direction. The second control range may be a change range of the center of gravity of the electronic device in the first direction caused by a position change of the counterweights in the first direction. The certain proportional relationships between the first value range, the first control range, and the second control range are determined. When the first parameter of the target application changes, the changing distance of the counterweights in the first direction may be proportionally adjusted based on the certain proportional relationships and the change amount of the first parameter, thereby adjusting the change distance of the center of gravity of the electronic device in the first direction. For example, the first value range may be [0, K], and the first control range may be [0, N]. The first value range and the first control range may be equally divided into M parts, where M is a positive integer. Whenever the first parameter is adjusted K/M, the counterweights are controlled to move N/M along the first direction.

In some embodiments, the display interface of the target application may have a certain display object, and the display effect of the certain display object may be configured to gradually change in the first direction or approximately in the first direction. The change amount of the first parameter may be associated with the change amount of the display effect of the certain display object in the first direction or approximately in the first direction. For example, the value of the first parameter may be associated with the height, length or position of the certain display object in the first direction.

In some embodiments, the method further includes when the target application satisfies a target condition, adjusting the center of gravity of the electronic device to the first position and then a third position. The third position is the position corresponding to the first parameter.

In some embodiments, the third position may be located between the first position and the second position. For example, when the first position is close to the left edge of the display unit and the second position is close to the right edge of the display unit, the third position may be located close to a middle position of the display unit in the left-right direction.

In some embodiments, the target condition may be that the target application needs to switch from a first display content to a second display content according to a control logic of the target application. In some embodiments, the target application satisfying the target condition includes at least one of the following: the target application performs an action of opening a target object, or a certain function button in the target application is triggered. The target object may be a file that can be opened in the target application, such as E-books, text documents, presentation documents, etc. For example, the first parameter may be used to indicate the e-book reading progress. When a historical record point is selected as a start reading point to read according to a display logic of the e-book software, the e-book software will simulate a page turning process of the physical book and turn pages from the cover to the historical record point. At this time, the display content of the e-book software needs to be switched from the cover to the historical record point. To ensure that the e-book software satisfies the target condition, the center of gravity of the electronic device may be adjusted to the first position close to the left edge of the electronic device. Then, according to the first parameter corresponding to the historical record point, the center of gravity of the electronic device is controlled to be adjusted to a position close to the middle or right edge of the electronic device. In this way, a reader is given a clear feeling of change of the center of gravity, forming a feeling similar to that of turning pages from the cover to a current reading point when reading a physical book.

In some embodiments, at S120, adjusting the center of gravity of the electronic device according to the first parameter may include the following processes.

The center of gravity of the electronic device is adjusted according to the first parameter such that a weight between the first part of the electronic device and the second part of the electronic device reaches a first ratio.

The target application includes a first display area and a second display area. The first part of the electronic device corresponds to the first display area, and the second part of the electronic device corresponds to the second display area. The first ratio is related to the display contents of the first display area and the second display area.

In some embodiments, the first display area and the second display area may be two of multiple display areas of the target application. The target application may have two display areas, or may have three or more display areas. Each display area may be divided according to the display contents of the target application or according to the hardware configuration of the display unit. For example, the display interface may be divided into multiple display areas according to the display objects of the target application. In another example, the electronic device includes multiple display units, and each display unit may be determined to display separately. In another example, when the electronic device includes a foldable display unit, the foldable display unit may be divided into multiple display areas along folding lines.

In some embodiments, the first part and the second part may respectively include parts of counterweights. For example, the first part may include a part of the counterweights corresponding to the first display area, and the second part may include another part of the counterweights corresponding to the second display area. The first part and the second part may include the entire physical structure of the electronic device. For example, the electronic device may be a foldable screen device. The electronic device may be divided into the first part and the second part along the folding line. In another example, the display interface of the target application may be divided into a left display area and a right display area along a vertical center line. The electronic device may be divided into a left part and a right part along the vertical center line. On the foldable screen device, the first part and the second part may include an interconnected center-of-gravity adjustment structure, such as a fluid adjustment structure. That is, fluid may flow between the first part and the second part. By adjusting proportions of the fluid between the first part and the second part, the center of gravity can be adjusted.

In some embodiments, the first display area may display a first display content, and the second display area may display a second display content. The target application may be configured to determine a first target amount of the first display content and a second target amount of the second display content based on the first parameter. The first ratio may be used to indicate a proportional relationship between the first target quantity and the second target quantity.

As shown in FIG. 2, taking an e-book reading scenario as an example, the display interface 200 is divided into a left display area 210 and a right display area 220 along a vertical center line of the display interface 200. The electronic device may be divided along the center line into a left part and a right part. The display interface 200 may be similar to the shape of the physical data plane. A left edge of the left display area 210 may display a read page edge 211 of the e-book, and a right edge of the right display area 220 may display an unread page edge 221 of the e-book. The first target amount may be a width P21 of the read page edge 211 in the left-right direction, and the second target amount may be a width P22 of the unread page edge 221 in the left-right direction. The first parameter may be the reading progress, or the current number of pages read. The first target amount and the second target amount may be determined based on the first parameter. The left display area 210 is controlled to display the read page edge 211 according to the first target amount, and the right display area 220 is controlled to display the unread page edge 221 according to the second target amount. Accordingly, the first ratio is determined according to the first target amount and the second target amount, and the center-of-gravity adjustment structure is controlled to adjust a proportional relationship between the weight of the left part and the weight of the right part according to the first ratio, thereby simulating a reading experience of physical books.

It should be understood that the above method is not limited to the application scenario of the e-book, but may also be applied in other application scenarios. For example, in a game scenario, the weight ratio of each part of the electronic device may be adjusted according to the proportional relationship of the game objects in each display area to enrich the game experience.

In some embodiments, at S120, adjusting the center of gravity of the electronic device according to the first parameter may include the following processes.

A target position is determined based on a position of at least one target object in the display area of the electronic device, and the center of gravity of the electronic device is adjusted to the target position.

In some embodiments, the target object is a display object in the display interface, and the position of the target object is the position of the display object in a display space. The position in the display space may be a display position in a two-dimensional display space or a display position in a three-dimensional display space. For example, the multiple display icons may be displayed in the display interface, and the target position of the center of gravity of the electronic device may be determined based on display positions of the multiple display icons. In another example, the target object may be a game object in the game interface, and the target position may be determined based on position information of the game object in a game space. The center of gravity of the electronic device is adjusted to the target position.

In some embodiments, the first parameter may include position information of at least one target object to determine a first target position. At least one second target position may be determined based on the first target position, weight parameters of the counterweights in a weight adjustment device, and weight parameters of other structures in the electronic device other than the counterweights. The counterweights are adjusted to the corresponding second target position, thereby adjusting the center of gravity of the electronic device to the first target position.

In some embodiments, determining the target position based on the position of at least one target object in the display area of the electronic device may include the following processes.

The target position is determined based on the position of at least one target object in the display area of the electronic device and parameter information of the target object.

In some embodiments, the parameter information of the target object includes but is not limited to the quantity, size, mass, speed, etc. of the target object. The mass and the speed may be a virtual mass and a virtual speed of the target object in the display space.

Taking the display interface as an example of displaying multiple folders at different locations, with varying numbers of files stored in each folder, the target position of the center of gravity may be determined based on the location information of the folders and the number of files in each folder, and the center of gravity of the electronic device may be adjusted to the target position.

Taking a snake game well-known to the public as an example, the target position may be determined based on snake's position information and length information. Then, the center of gravity of the electronic device is adjusted to the target position. Of course, during the game, the snake's position information and length information are constantly changing, and the center of gravity of the electronic device is constantly adjusted accordingly.

In some embodiments, at S120, adjusting the center of gravity of the electronic device according to the first parameter may include the following processes.

Usage pattern information of the electronic device is determined.

The target location is determined based on the first parameter and the usage pattern information.

The center of gravity of the electronic device is adjusted to the target position.

In some embodiments, the usage pattern information may be used to indicate posture of the electronic device. For example, the usage pattern information may be used to indicate that the electronic device is in a landscape display mode or in a portrait display mode. The usage pattern information may also be used to indicate the display mode of the electronic device. For example, the usage mode information may be used to indicate that the electronic device is in a two-dimensional display mode or a three-dimensional display mode.

When determining the usage pattern information of the electronic device, the center of gravity adjustment strategy of the electronic device in the corresponding usage pattern may be determined based on the usage pattern information. The target position of the center of gravity may be determined based on the first parameter and the center of gravity adjustment strategy. Then, the center of gravity of the electronic device may be adjusted to the target position. Thus, the center of gravity adjustment method matches the usage pattern, thereby further improving the user experience.

In some embodiments, when the usage pattern information includes holding position information of the electronic device, determining the target position according to the first parameter and the usage pattern information may include: determining the target position according to the first parameter and the holding position information.

In some embodiments, a holding posture of the electronic device may be determined based on the holding position information. For example, the holding position information may be used to determine the holding posture of the electronic device, such as holding with one hand, holding with both hands around, or holding with both hands sideways. Then, the center of gravity adjustment strategy for the holding posture may be determined, and the target position is determined based on the center of gravity adjustment strategy and the first parameter. Thus, not only users are provided with a changing center of gravity experience, but also comfort of using the electronic device is improved.

In some embodiments, at S120, adjusting the center of gravity of the electronic device according to the first parameter may include the following processes.

It is determined that the electronic device enters a holding usage pattern, and the center of gravity of the electronic device is adjusted according to the first parameter.

In some embodiments, whether the electronic device enters the holding usage pattern may be determined based on the usage pattern information. If it is determined that the electronic device is in the holding usage pattern, the center of gravity of the electronic device is adjusted according to the first parameter. If it is determined that the electronic device is not in the holding usage pattern, the center of gravity of the electronic device will not be adjusted. As such, the electronic device may be prevented from performing unnecessary center of gravity adjustments in a non-holding usage pattern, which avoids unnecessary energy consumption and prevents unnecessary center of gravity adjustments from affecting the normal operation of the electronic device in other usage patterns.

In some embodiments, at S120, adjusting the center of gravity of the electronic device according to the first parameter may include: controlling the center of gravity of the electronic device to change according to a preset trajectory, where the first parameter includes parameters corresponding to displayed notifications.

When the target application generates a notification, the parameters corresponding to the displayed notifications may be obtained. Based on the parameters corresponding to the displayed notifications, the center of gravity of the electronic device is controlled to change according to the preset trajectory, forming a center of gravity change experience corresponding to the preset trajectory, and reminding the user that the electronic device has received the notifications through the center of gravity change experience.

In some embodiments, the electronic device may have multiple preset trajectories, and each of the multiple preset trajectories may provide multiple different types of center of gravity changing experiences. When the target application generates a notification, the type of the notification may be determined, and a corresponding preset trajectory may be selected according to the type of the notification, such that the type of the notification is reflected through different types of center of gravity changing experiences. As such, the user can quickly and accurately determine the type of the notification based on the center of gravity changing experience.

Figure 3:
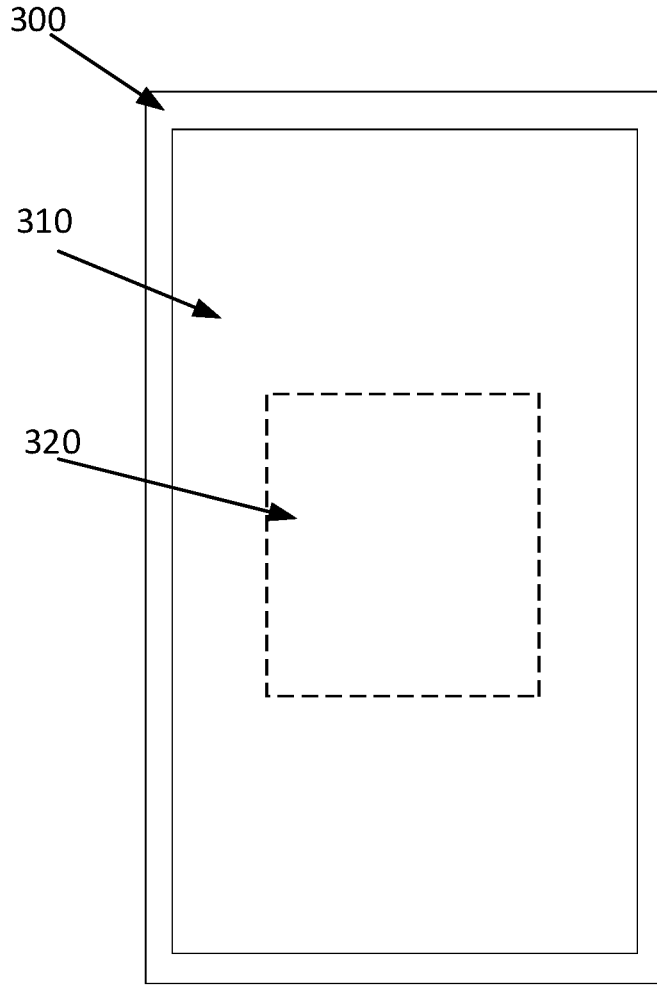
FIG. 3 is a structural diagram of an electronic device according to some embodiments of the present disclosure.

The present disclosure also provides an electronic device 300. FIG. 3 is a structural diagram of an electronic device 300 according to some embodiments of the present disclosure. Referring to FIG. 3, the electronic device 300 include a display unit 310 and a center-of-gravity adjustment structure 320. The display unit 310 is configured to display the display content of the target application. The center-of-gravity adjustment structure 320 is configured to adjust the center of gravity of the electronic device 300 according to the first parameter when obtaining the first parameter associated with the display content of the target application. The target application runs on the electronic device 300.

Figure 4:
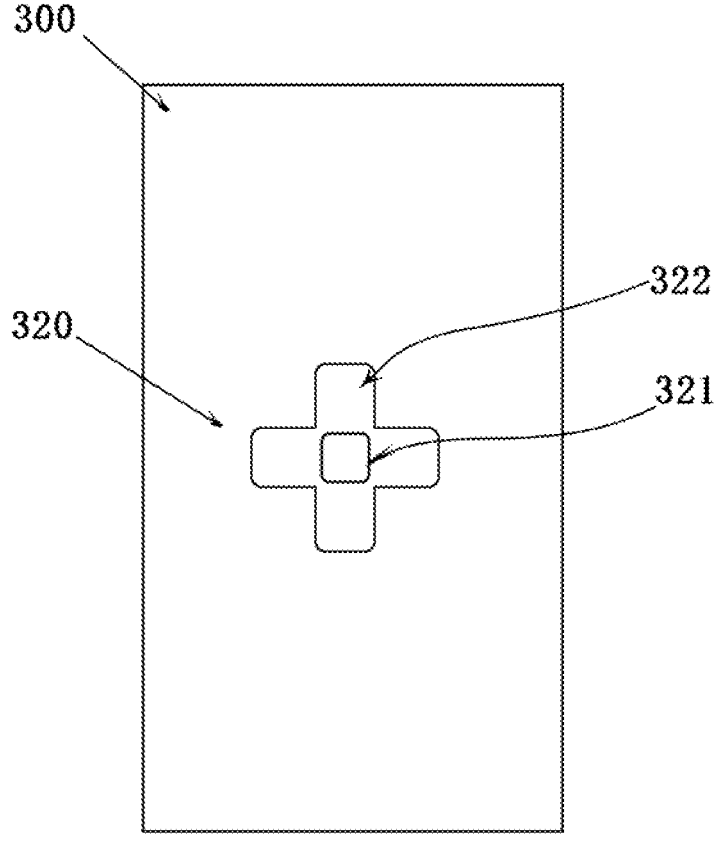
FIG. 4 is a structural diagram of a center-of-gravity adjustment structure in an electronic device according to some embodiments of the present disclosure.

FIG. 4 is a structural diagram of a center-of-gravity adjustment structure in an electronic device according to some embodiments of the present disclosure. In some embodiments, as shown in FIG. 4, the center-of-gravity adjustment structure 320 includes a driving device and a counterweight 321. For example, a cross-shaped track 322 may be configured on the electronic device 300. The counterweight 321 moves on the cross-shaped track 322. The driving device is configured to drive the counterweight 321 to move based on a magnetic force. Of course, the driving device may also be connected to the counterweight 321 through a mechanical transmission structure. The driving device may drive the counterweight 321 to move in a left-right direction or an up-down direction in FIG. 4 to adjust the center of gravity of the electronic device 300.

It should be understood that FIG. 4 only shows one counterweight 321, a horizontal track 322 extending along the left-right direction in FIG. 4, and a vertical track 322 extending along the upper line direction in FIG. 4. However, in certain implementation, multiple horizontal tracks 322, multiple vertical tracks 322, and multiple counterweights 321 may be provided according to actual needs.

Figure 5:
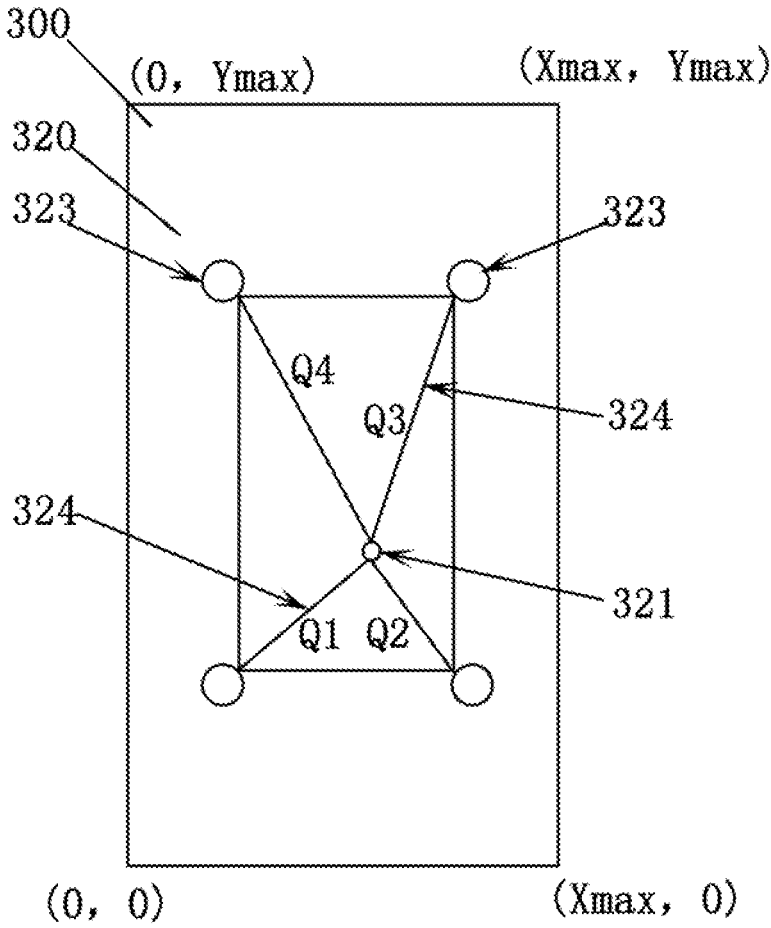
FIG. 5 is a structural diagram of another center-of-gravity adjustment structure in an electronic device according to some embodiments of the present disclosure.

FIG. 5 is a structural diagram of another center-of-gravity adjustment structure in an electronic device according to some embodiments of the present disclosure. In some embodiments, as shown in FIG. 5, the center-of-gravity adjustment structure 320 includes a driving device and a counterweight 321. The electronic device 300 includes a rectangular movement area, and the counterweight 321 is movably disposed therein. The driving device includes four driving motors 323. The four driving motors 323 are respectively arranged at the four corners of the movement area. The four driving motors 323 are respectively connected to the counterweight 321 through ropes 324. Each driving motor 323 may wind or release a rope 324 to adjust a release length of the rope 324, thereby adjusting the position of the counterweight 321.

A rectangular coordinate system is constructed with the lower left corner of the movement area in FIG. 5 as the coordinate origin. The coordinates of the upper right corner of the movement area in FIG. 5 is ($X_{max}$, $Y_{max}$), and the coordinates of the counterweight 321 is (X, Y). The release lengths of the four ropes 324 are $Q_1$, $Q_2$, $Q_3$, and $Q_4$, respectively, and the following relationships exist between the release lengths of the four ropes 324 and the coordinates of the counterweight 321.

$$Q_1 = \sqrt{X^2 + y^2}$$
$$Q_2 = \sqrt{(X_{max} - X)^2 + Y^2}$$
$$Q_3 = \sqrt{(X_{max} - X)^2 + (Y_{max} - Y)^2}$$
$$Q_4 = \sqrt{X^2 + (Y_{max} - Y)^2}$$

In some embodiments, the four driving motors 323 may be controlled to release and retract the ropes 324 based on the above relationships, thereby adjusting the position of the counterweight. It should be noted that the center-of-gravity adjustment structure 320 is merely exemplary. In actual implementations, the electronic device 300 may include various types of center-of-gravity adjustment structures 320 as long as the center of gravity of the electronic device 300 can be adjusted.

In some embodiments, the first parameter may vary within the first value range. When the first parameter is the minimum value within the first value range, the center of gravity of the electronic device 300 is located close to the first position of the first edge of the electronic device 300. When the first parameter is the maximum value within the first value range, the center of gravity of the electronic device 300 is located close to the second position of the second edge of the electronic device 300. The second edge is the edge on the opposite side of the first edge.

In some embodiments, the change amount of the first parameter has a certain proportional relationship with the change distance of the center of gravity of the electronic device in the first direction. The first direction is perpendicular to the first edge and points toward the direction from the first edge to the second edge. The first direction matches the display direction of the switching effect of the target application.

In some embodiments, the center-of-gravity adjustment structure 320 is further configured to: in response to the target application satisfying the target condition, adjust the center of gravity of the electronic device 300 to the first position and the third position successively. The third position is the position corresponding to the first parameter.

In some embodiments, the center-of-gravity adjustment structure 320 is further configured to: determine the target position based on the position of the at least one target object in the display area of the electronic device 300, and adjust the center of gravity of the electronic device 300 to the target position.

In some embodiments, the center-of-gravity adjustment structure 320 is further configured to: determine the target position based on the position of the at least one target object in the display area of the electronic device 300 and the parameter information of the target object.

In some embodiments, the center-of-gravity adjustment structure 320 is further configured to: determine the usage pattern information of the electronic device 300, determine the target position based on the first parameter and the usage pattern information, and adjust the center of gravity of the electronic device 300 to the target position.

In some embodiments, the center-of-gravity adjustment structure 320 is further configured to: in response the usage pattern information including the holding position information of the electronic device 300, determine the target position based on the first parameter and the holding position information.

In some embodiments, the center-of-gravity adjustment structure 320 is further configured to: determine that the electronic device 300 enters the holding usage pattern, and adjust the center of gravity of the electronic device 300 based on the first parameter.

In some embodiments, the target application includes the first display area and the second display area. The center-of-gravity adjustment structure 320 is further configured to: adjust the center of gravity of the electronic device 300 based on the first parameter such that the weight between the first part of the electronic device 300 and the second part of the electronic device 300 reaches the first ratio. The first part of the electronic device 300 corresponds to the first display area, and the second part of the electronic device 300 corresponds to the second display area. The first ratio is related to the display contents of the first display area and the second display area.

In some embodiments, the first parameter includes the parameters corresponding to the displayed notifications, and the center-of-gravity adjustment structure 320 is further configured to: control the center of gravity of the electronic device 300 to change according to the preset trajectory.

The above embodiments are merely exemplary and are not used to limit the present disclosure. The protection scope of the present disclosure is defined by the appended claims. Those skilled in the art may make various modifications or equivalent substitutions to the present disclosure within the principle and protection scope of the present disclosure, and such modifications or equivalent substitutions should also be deemed to fall within the protection scope of the present disclosure.

What is claimed is:

1. A device control method, comprising:

retrieving a first parameter associated with a display content of a target application running on an electronic device, the target application including a first display area and a second display area; and in response to receiving the first parameter retrieved from the display content of the target application, automatically adjusting a center of gravity of the electronic device based on the first parameter, such that a weight between a first part of the electronic device and a second part of the electronic device reaches a first ratio, wherein the first part of the electronic device corresponds to the first display area, the second part of the electronic device corresponds to the second display area, and the first ratio is related to display contents of the first display area and the second display area;

wherein:

the first parameter is the information of weight of viewing virtual object on the target application corresponding to the weight of a real physical object being viewed by a user;

the first parameter varies in a first value range;

when the first parameter is the minimum value of the first value range, the center of gravity of the electronic device is located close to a first position of a first edge of the electronic device;

when the first parameter is the maximum value of the first value range, the center of gravity of the electronic device is located close to a second position of a second edge of the electronic device, the first edge and the second edge being opposite to each other; and a change amount of the first parameter has a certain proportional relationship with a change distance of the center of gravity of the electronic device in a first direction, the first direction is perpendicular to the first edge and points toward a direction from the first edge to the second edge, and the first direction matches a display direction of a switching effect of the target application.

2. The method according to claim 1, further comprising:

in response to the target application satisfying a target condition, adjusting the center of gravity of the electronic device to the first position and a third position successively, the third position being a position corresponding to the first parameter.

3. The method according to claim 1, wherein adjusting the center of gravity of the electronic device based on the first parameter comprises:

determining a target position based on a position of at least one target object in a display area of the electronic device and adjusting the center of gravity of the electronic device to the target position.

4. The method according to claim 3, wherein determining the target position based on the position of the at least one target object in the display area of the electronic device comprises:

determining the target position based on the position of the at least one target object in the display area of the electronic device and parameter information of the at least one target object.

5. The method according to claim 1, wherein adjusting the center of gravity of the electronic device based on the first parameter comprises:

determining usage pattern information of the electronic device;

determining the target position based on the first parameter and the usage pattern information; and adjusting the center of the gravity of the electronic device to the target position.

6. The method according to claim 5, wherein the usage pattern information includes holding position information of the electronic device, and determining the target position based on the first parameter and the usage pattern information comprises:

determining the target position based on the first parameter and the holding position information.

7. The method according to claim 1, wherein adjusting the center of gravity of the electronic device based on the first parameter comprises:

determining that the electronic device enters a holding usage pattern and adjusting the center of gravity of the electronic device based on the first parameter.

8. The method according to claim 1, wherein the first parameter includes a parameter corresponding to a displayed notification, and adjusting the center of gravity of the electronic device based on the first parameter comprises:

controlling the center of gravity of the electronic device to change according to a preset trajectory.

9. An electronic device, comprising:

a processor configured to:

control a display unit to display a display content of a target application running on the electronic device, the target application including a first display area and a second display area; and control a center-of-gravity adjustment structure to retrieve a first parameter associated with a display content of the target application, and in response to receiving the first parameter retrieved from the display content of the target application, automatically adjust a center of gravity of the electronic device based on the first parameter, such that a weight between a first part of the electronic device and a second part of the electronic device reaches a first ratio, wherein the first part of the electronic device corresponds to the first display area, the second part of the electronic device corresponds to the second display area, and the first ratio is related to display contents of the first display area and the second display area;

wherein:

the first parameter is the information of weight of viewing virtual object on the target application corresponding to the weight of a real physical object being viewed by a user;

the first parameter varies in a first value range;

when the first parameter is the minimum value of the first value range, the center of gravity of the electronic device is located close to a first position of a first edge of the electronic device;

when the first parameter is the maximum value of the first value range, the center of gravity of the electronic device is located close to a second position of a second edge of the electronic device, the first edge and the second edge being opposite to each other; and a change amount of the first parameter has a certain proportional relationship with a change distance of the center of gravity of the electronic device in a first direction, the first direction is perpendicular to the first edge and points toward a direction from the first edge to the second edge, and the first direction matches a display direction of a switching effect of the target application.

10. The device according to claim 9, wherein the processor is further configured to control the center-of-gravity adjustment structure is further configured to:

in response to the target application satisfying a target condition, adjust the center of gravity of the electronic device to the first position and a third position successively, the third position being a position corresponding to the first parameter.

11. The device according to claim 9, wherein the processor is further configured to control the center-of-gravity adjustment structure to, when adjusting the center of gravity of the electronic device based on the first parameter, the center-of-gravity adjustment structure is further configured to:

determine a target position based on a position of at least one target object in a display area of the electronic device and adjusting the center of gravity of the electronic device to the target position.

12. The device according to claim 11, wherein the processor is further configured to control the center-of-gravity adjustment structure to, when determining the target position based on the position of the at least one target object in the display area of the electronic device, the center-of-gravity adjustment structure is further configured to:

determine the target position based on the position of the at least one target object in the display area of the electronic device and parameter information of the at least one target object.

13. The device according to claim 9, wherein the processor is further configured to control the center-of-gravity adjustment structure to, when adjusting the center of gravity of the electronic device based on the first parameter, the center-of-gravity adjustment structure is further configured to:

determine usage pattern information of the electronic device;

determine the target position based on the first parameter and the usage pattern information; and adjust the center of the gravity of the electronic device to the target position.

14. The device according to claim 13, wherein the usage pattern information includes holding position information of the electronic device, and the processor is further configured to control the center-of-gravity adjustment structure to, when determining the target position based on the first parameter and the usage pattern information, the center-of-gravity adjustment structure is further configured to:

determine the target position based on the first parameter and the holding position information.

15. The device according to claim 9, wherein the processor is further configured to control the center-of-gravity adjustment structure to, when adjusting the center of gravity of the electronic device based on the first parameter, the center-of-gravity adjustment structure is further configured to:

determine that the electronic device enters a holding usage pattern and adjusting the center of gravity of the electronic device based on the first parameter.

* * * * *